June 29, 1926.　　　　W. F. HAMILTON　　　　1,590,577
CORN HEADER
Filed Dec. 28, 1921　　　3 Sheets-Sheet 1

INVENTOR.
William Francis Hamilton
BY Westall and Wallace
ATTORNEYS.

June 29, 1926.

W. F. HAMILTON

CORN HEADER

Filed Dec. 28, 1921

1,590,577

3 Sheets-Sheet 3

INVENTOR.
William Francis Hamilton
BY
ATTORNEYS.

Patented June 29, 1926.

1,590,577

UNITED STATES PATENT OFFICE.

WILLIAM FRANCIS HAMILTON, OF VENTURA, CALIFORNIA.

CORN HEADER.

Application filed December 28, 1921. Serial No. 525,321.

This invention relates to a heading machine for kaffir corn and like plants having stalks of various heights and this application is a continuation in part of application Serial No. 357,141, filed by me February 9, 1920.

Kaffir corn, when ripe for heading, has stalks carrying heads at varying heights, several stalks growing in one hill. The plants when ready for heading, have stalks which are yet green and heads which are ripe. After heading, the corn is piled, as is the custom, and if any appreciable length of green stalks are cut with the heads, heating of the piles will occur and the corn will spoil. It is therefore necessary to cut the stalks close to the heads. Headers have been devised which attempt to bend the stalks so that the heads are at an equal level and then cut the heads by knives, cutters, or the like. Kaffir corn is of such a character that when the stalks are bent, it weakens the latter so that many fall to the ground and a cutter will pass over them without severing the heads from the stalks.

The objects of this invention are first, to provide a header which will equalize the height of the heads by bending or folding the stalks and will prevent them from passing below the plane of the cutter; second, to provide a header having a comb upon which the folded heads may rest as they are moved toward the table; and third, to provide folding means so disposed with relation to the folding table that stalks may pass through the ways in the table without crossing and becoming jammed.

Figure 1:
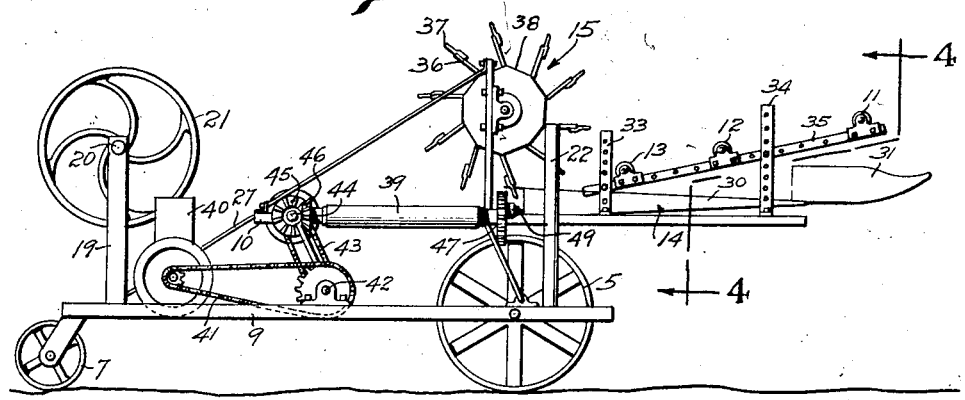
Figure 2:
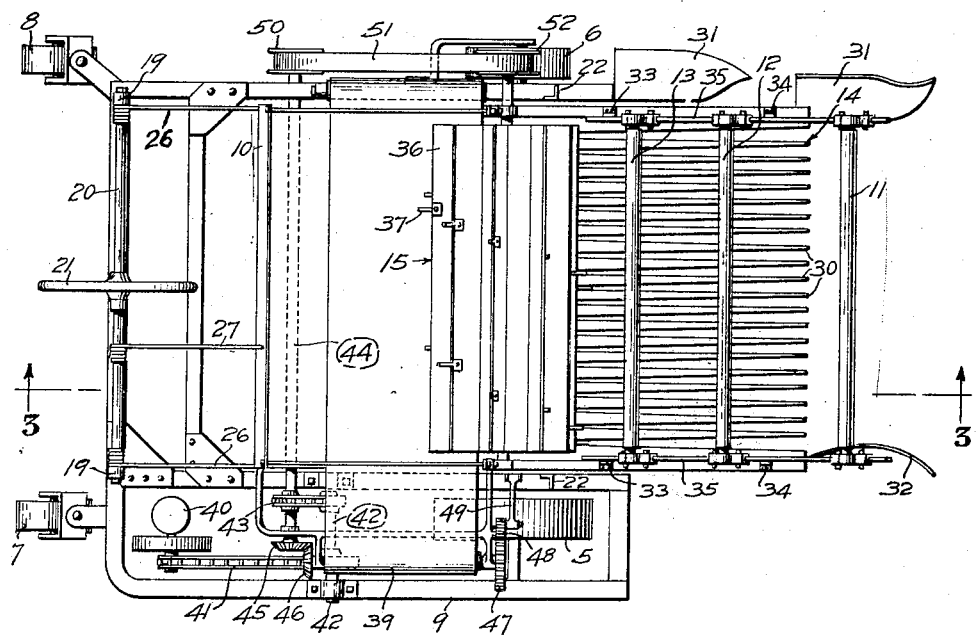
Figure 3:
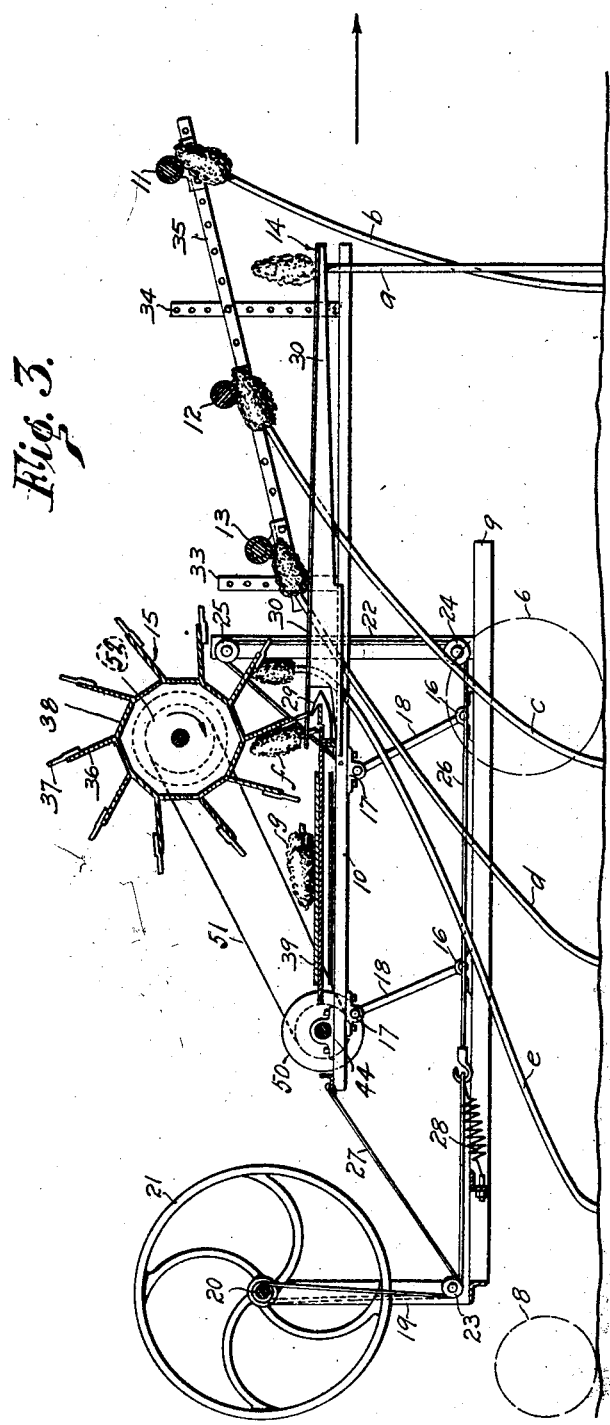
Figure 4:
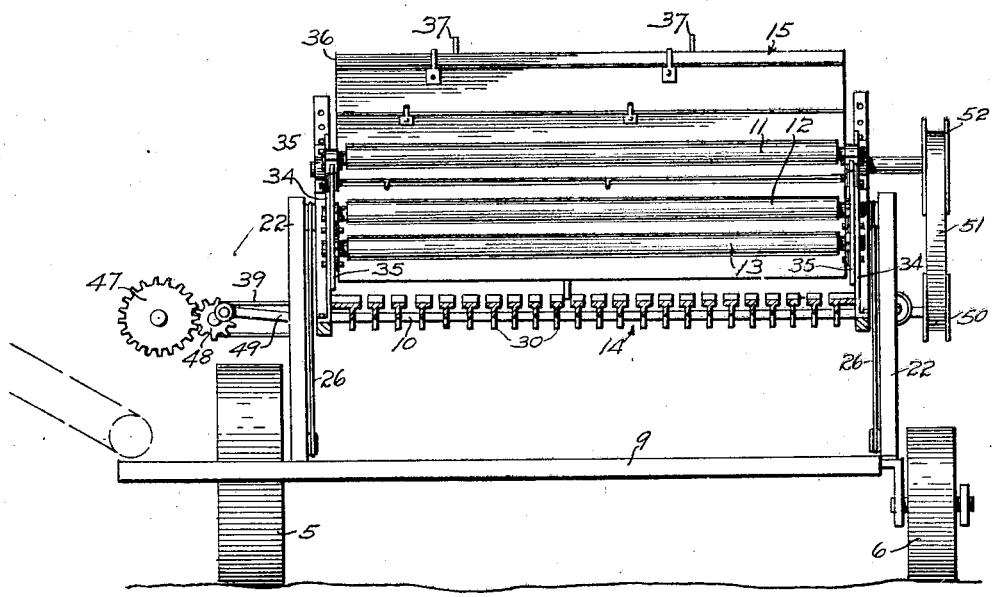

I accomplish these objects as well as other objects and corresponding accomplishments by means of the embodiment of my invention illustrated in the accompanying drawing, in which:

Fig. 1 is a side elevation of a header; Fig. 2 is a plan view of the structure; Fig. 3 is an enlarged section taken on the line 3—3 of Fig. 2; and Fig. 4 is a section taken on the line 4—4 of Fig. 1.

Referring more particularly to the drawing, the machine is supported upon wheels, 5, 6, 7, and 8, secured to a suitable frame 9. Mounted upon the frame 9 is an adjustable subframe 10, which carries equalizer bars 11, 12, and 13, to level the heads, a supporting comb 14 acting as a folding table, and a head straightening reel 15.

The main frame 9 is preferably formed of angle irons, and mounted thereon at the sides are bearing blocks 16, see Fig. 3. Mounted on the under side of the side members of subframe 10 are bearing blocks 17. Extending between corresponding blocks on the main and subframes are supporting links 18 so arranged that the subframe may be raised and lowered with respect to the main frame. For this purpose, standards 19 are mounted on the main frame at the rear, and journalled therein is a shaft 20 having a hand wheel 21 for turning the same. Standards 22 are mounted on the main frame at the forward end. Journalled on each standard 19 is a pulley 23, see Fig. 3. Journalled on each of the standards 22 are pulleys 24 and 25. Secured to the shaft 20, wrapped therearound, passed over each set of pulleys, 23, 24, and 25, and secured to the front end of the subframe 10 are cables 26. Thus, on winding cables 26 on the shaft, the subframe 10 will be pulled forward and elevated on links 18. On unwinding the cable, the subframe is free to lower. To positively lower the subframe a cable 27 is secured to the rear end of the frame, passed over a pulley on the main frame, wound around shaft 20 in a direction opposite to cables 26 and secured to the shaft. To serve as a counterbalance for the subframe, tension springs 28 are secured to cables 26 and to the main frame. It will be noted that upon elevating the subframe, the latter is moved forwardly, and upon lowering it the frame is moved rearwardly. I have described specific means for raising and lowering the subframe for illustrative purposes only, as other means may be used.

Mounted on the subframe at the forward end is a reciprocating sickle 29 of the reaper type for severing the heads from the stalks. Extending forwardly of and above the sickle are spaced long teeth 30 forming the comb 14 which supports the equalized heads. These are preferably in alignment with the teeth on the sickle and are carried over and back of the sickle knife so that the stalks remaining on the heads may ride over the sickle knife after being cut. At the sides of the subframe adjacent the front of the teeth 30 is an outside divider 31 to separate the corn being harvested from that which is standing, and a guard 32 to gather in stalks bent away from the machine. Secured to the subframe at the sides and extending upwardly are arms 33 and 34 having a series of bolt holes. Secured to a set of bars 33 and 34 is an inclined bar 35. Mounted upon each bar 35 are bearing blocks in which are journalled equalizer bars in the form of rollers indicated by 11, 12, and 13. It will be noted that bars 35 are so connected to the bars 33 and 34, that the former may be adjusted as to height and inclination. Bars 35 are made of such length that the forward roller 11 is disposed above and in front of the teeth 30. Disposed above the sickle 29 is the reel 15, having blades 36 with fingers 37, which sweep between the teeth on the supporting comb. The reel 15 has a wall 38 to prevent any stalks from straightening up and raising after being folded.

Disposed back of the sickle and upon the frame is a draper 39 travelling transversely of the frame and driven by suitable gearing. The severed heads fall upon the draper and are carried to an elevator, not shown. This elevator may be of the type used in harvesters.

Mounted upon the main frame at the rear thereof is an engine or motor 40, which drives by means of a sprocket chain 41, a shaft 42. Shaft 42 is geared by a sprocket chain 43 to a shaft 44 journalled on the subframe. Mounted upon shaft 44 is a bevel gear 45 which meshes with a bevel gear 46 secured to the drive roller of the draper. Thus, the draper is driven. On the other end of the drive roller is a gear 47 in mesh with a pinion 48 forming a crank wheel, to which a pitman 49 operating the sickle bar is connected. On the other end of shaft 44 is a pulley 50 geared by a belt 51 to a pulley 52 operating the reel 15.

The header is advanced along the field by any suitable traction means. As the machine advances, stalks pass between the teeth of the supporting comb or folding table, the heads of the high stalks being encountered by the equalizers and the stalks bent until the heads are level so that they may pass under the lowest equalizer. The teeth of the folding table support the stalks which may tend to fall lower. The reel with its blades straightens the heads to a vertical position and then sweeps them back against the sickle, the latter severing them. The fingers upon the blades of the reel assist in preventing the stalks or heads from clogging the teeth. If any of the stalks tend to rise, the wall on the reel will prevent them. The equalizer being in the form of rollers, permits the high stalks to pass thereunder without tearing the stalks from the heads, aiding in a smooth operation of the device.

Referring particularly to Fig. 3, stalks of varying lengths and their position while being acted upon by the machine are shown. Stalk $a$ has a head just about the height of the comb, so that it enters between the teeth and passes back to the sickle without being bent. Stalk $b$ has a head as high as the equalizer roller 11. This stalk is shown as disposed in the same hill as stalk $a$, and behind stalk $a$ with respect to the direction in which the header is moving. The roller 11 being in advance of the folding table, encounters the head of stalk $b$ and bends the latter so that at the plane of the folding table, stalk $b$ will be in front of stalk $a$ and will permit the latter to enter first between the teeth. Thus, the shorter stalks in a hill are permitted to enter between the teeth before the higher stalks are bent. Where the roller is at the front of the folding table teeth or back of the folding table teeth, the higher stalks will be bent after the lower stalks have entered between the teeth. In a case where the stalks are in the position of the stalks $a$ and $b$, stalk $b$ will be bent forward after it has entered between the teeth and must pass stalk $a$ which is in front of it. This results in the stalks being crossed in the spaces between the teeth and jamming and clogging of the supporting comb. Stalk $b$ is bent by the equalizers so that the head will eventually sink onto the folding table and slide along between the teeth. Stalk $c$ which is a high stalk is shown being bent by equalizer roller 12 toward the table. The head of stalk $d$ has passed to the rear of the equalizer roll 13 and sunk upon the comb. Stalk $e$ is shown in position with its head being straightened by the reel. This avoids cutting too long a stalk with the head. A head $f$ is shown after it has been severed and as it is being swept back upon the draper, while head $g$ is on the draper. The height of the subframe is adjusted to take the lowest heads. In certain sections where corn of this character is grown, the heads in a hill will vary from two to eight feet in height. With the stalks of an eight foot head bent to equalize in height and no provision made for straightening the head in upright position, too much of the stalk would be cut with the head. If any of the long stalks are strong and rise after being bent, the wall of the reel depresses them. It is obvious that with my machine the heads are cut with stalks of substantially uniform length.

What I claim is:

1. In a header for plants, the combination of a cutter, a substantially horizontal supporting comb having relatively long teeth extending forwardly thereof for supporting folded heads and guiding the plants toward the cutter with the heads above the latter, folding means to bend the heads onto said comb extending the width of said cutter and above the level thereof, and a straightening feeder with impellers extending from said feeder for sweeping the plants being reaped toward said cutter with their heads in an upright position.

2. In a header for plants, the combination of a cutter, a supporting comb extending forwardly thereof for supporting folded heads and guiding the plants toward the cutter, means to equalize the height of the heads, a straightening feeder having impellers extending from said feeder for sweeping the plants being reaped toward said cutter with their heads in an upright position, and fingers carried by said feeder disposed to enter between the teeth of said comb.

3. In a header for plants, the combination of a cutter, a supporting comb extending forwardly thereof for supporting folded heads and guiding the plants toward the cutter, means to equalize the height of the heads and a straightening reel in advance of said cutting means having blades extending from said reel so as to sweep the plants being reaped toward said cutter with their heads in an upright position and fingers carried by said reel disposed to enter between the teeth of said comb.

In witness that I claim the foregoing I have hereunto subscribed my name this 20th day of December, 1921.

WILLIAM FRANCIS HAMILTON.